(12) United States Patent
Park (10) Patent No.: US 11,399,142 B2
(45) Date of Patent: Jul. 26, 2022

(54) SYSTEM AND METHOD OF PROCESSING MASKING REGION

(71) Applicant: ELECTRONICS AND TELECOMMUNICATIONS RESEARCH INSTITUTE, Daejeon (KR)

(72) Inventor: So Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 308 days.

(21) Appl. No.: 16/749,762

(22) Filed: Jan. 22, 2020

(65) Prior Publication Data

US 2020/0236302 A1 Jul. 23, 2020

(30) Foreign Application Priority Data

Jan. 23, 2019 (KR) .................. 10-2019-0008851

(51) Int. Cl.
*H04N 5/262* (2006.01)
*H04N 19/176* (2014.01)
*H04N 5/272* (2006.01)
*G06V 10/20* (2022.01)

(52) U.S. Cl.
CPC ......... *H04N 5/2621* (2013.01); *G06V 10/255* (2022.01); *H04N 5/272* (2013.01); *H04N 19/176* (2014.11)

(58) Field of Classification Search
CPC .... H04N 5/2621; H04N 5/272; H04N 19/176; H04N 19/117; H04N 19/132; H04N 19/174; H04N 19/46; H04N 19/66; H04N 19/467; G06V 10/255; G06V 20/625; G06V 10/25; G06V 10/50; G06V 20/00; G06V 40/161; G06T 5/004; G06T 5/007; G06T 5/40; G06T 7/11
See application file for complete search history.

(56) References Cited

U.S. PATENT DOCUMENTS

| | | | |
|---|---|---|---|
| 9,076,065 B1* | 7/2015 | Vijayanarasimhan | ...................... G06K 9/6256 |
| 10,062,406 B2 | 8/2018 | Park et al. | |
| 2003/0053704 A1* | 3/2003 | Yamaguchi | ............ H04N 19/29 382/239 |
| 2011/0085035 A1 | 4/2011 | Choi et al. | |
| 2011/0150327 A1 | 6/2011 | Yoo et al. | |
| 2012/0236935 A1* | 9/2012 | Dutt | ..................... H04N 19/157 375/240.03 |

(Continued)

FOREIGN PATENT DOCUMENTS

KR 1020160066068 A 6/2016
KR 1020170084601 A 7/2017

*Primary Examiner* — Sinh Tran
*Assistant Examiner* — Zhenzhen Wu
(74) *Attorney, Agent, or Firm* — Rabin & Berdo, P.C.

(57) ABSTRACT

A system for processing a masking region includes a transmitter configured to detect an object region, on which masking is to be performed, from an input image through a camera, convert the detected object region into a block region to perform masking, and encode and transmit an input image on which the masking is completed and a receiver configured to decode an image transmitted from the transmitted to extract a frame therefrom, detect a masked block region by units of extracted frames, and unmask the detected block region to restore the masked image to an original image.

11 Claims, 10 Drawing Sheets

(56) References Cited

U.S. PATENT DOCUMENTS

| | | | |
|---|---|---|---|
| 2016/0155465 A1* | 6/2016 | Park | G11B 20/005 386/241 |
| 2018/0174414 A1* | 6/2018 | Edpalm | H04L 63/16 |
| 2021/0006835 A1* | 1/2021 | Slattery | G06T 5/002 |
| 2021/0319144 A1* | 10/2021 | Ishimaru | H04N 5/23229 |

* cited by examiner

COORDINATE REGION-BASED MASKING

FIG. 7B

BLOCK-BASED MASKING

SYSTEM AND METHOD OF PROCESSING MASKING REGION

CROSS-REFERENCE TO RELATED APPLICATIONS

This application claims priority under 35 U.S.C. § 119 to Korean Patent Application No. 10-2019-0008851, filed on Jan. 23, 2019, the disclosure of which is incorporated herein by reference in its entirety.

TECHNICAL FIELD

The present invention relates to a system and method of processing a masking region, and more particularly, to a system and method of processing a masking region, which set and detect a masking region on the basis of a block.

BACKGROUND

Figure 1:
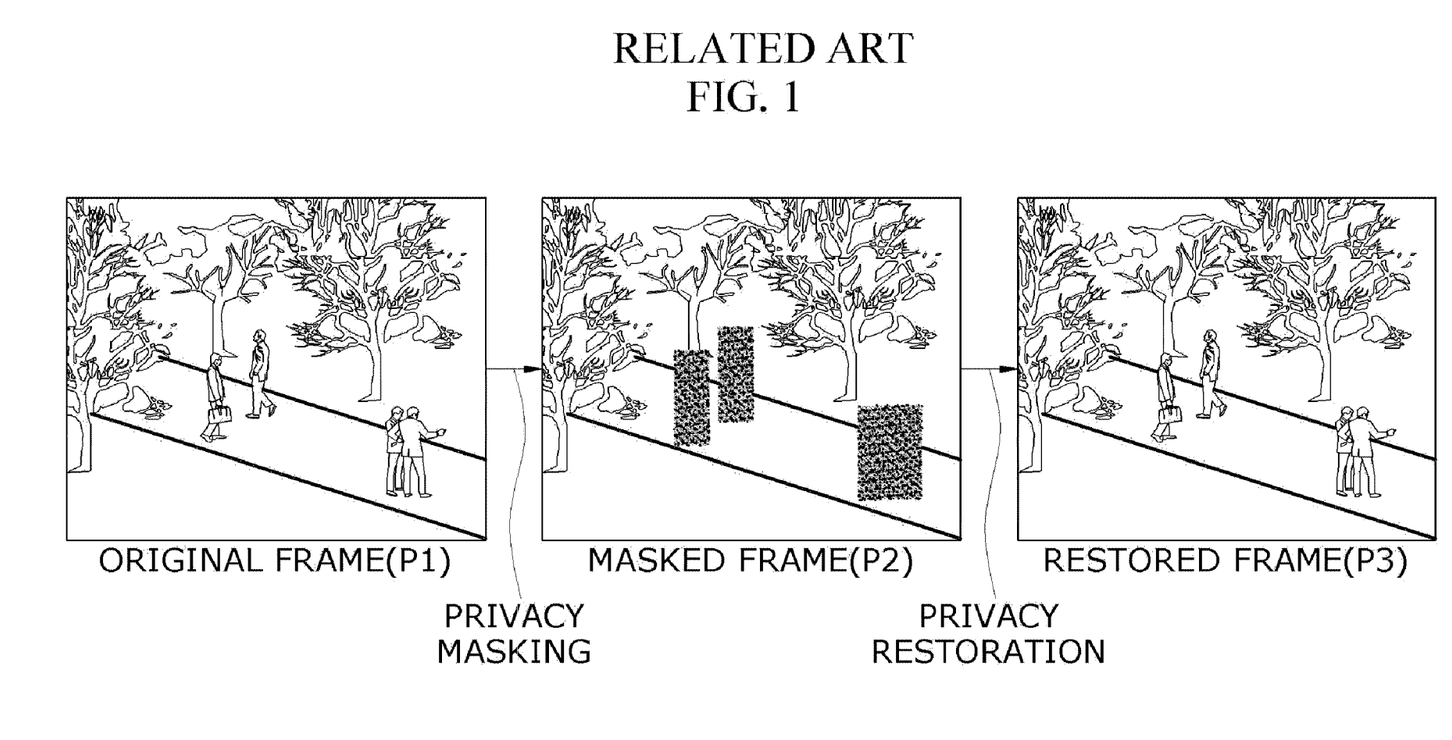
FIG. 1 is a diagram for describing privacy masking technology.

FIG. 1 is a diagram for describing privacy masking technology.

The privacy masking technology is for detecting a privacy region such as a face or a vehicle license plate for identifying a person and converting the detected region so as not to be identified.

That is, as in FIG. 1, masking is performed (P2) on a privacy region of an original frame P1, and a masked image is restored to an original frame P3.

In order to provide a privacy masking service for restoring an original image, a transmitter for transmitting an image and a receiver for receiving the image should share detected masking region information.

In this context, in the related art, the transmitter converts the masking region information into the form of metadata and transmits the metadata to the receiver, thereby allowing the transmitter and the receiver to share the masking region information.

Technology for transferring masking region information having the form of metadata has a problem where a transmitter should generate and transmit the metadata independently from an original image, a receiver should the masked image and the metadata, and the masked image should be synchronized with metadata information in a case which restores to an original image.

Alternatively, technology for inserting masking region information into a specific position of an image frame may be considered, and in this case, there is a possibility that pixel information is damaged due to image loss which occurs in encoding(compressing) a moving image, whereby it is difficult to apply the technology in a case which is needed to compress a moving image.

SUMMARY

Accordingly, the present invention provides a system and method of processing a masking region, which provide privacy region information having the form of blocks instead of the form of metadata or pixel information, thereby enabling a transmitter and a receiver to share masking region information even when encoding is applied to an image.

The objects of the present invention are not limited to the aforesaid, but other objects not described herein will be clearly understood by those skilled in the art from descriptions below.

In one general aspect, a system for processing a masking region includes a transmitter configured to detect an object region, on which masking is to be performed, from an input image through a camera, convert the detected object region into a block region to perform masking, and encode and transmit an input image on which the masking is completed and a receiver configured to decode an image transmitted from the transmitted to extract a frame therefrom, detect a masked block region by units of extracted frames, and unmask the detected block region to restore the masked image to an original image.

In an embodiment, the transmitter may detect the object region, expressed as coordinate information, from the input image through the camera.

In an embodiment, the coordinate information may include a start x coordinate of the object region, a start y coordinate of the object region, a width of the object region, and a height of the object region.

In an embodiment, the transmitter may divide the frame of the input image into blocks each having a predetermined size and may convert the object region expressed as the coordinate information into the block region.

In an embodiment, the transmitter may check whether the detected object region is included in the block region, and when it is checked that the detected object region is included in the block region, the transmitter may label the object region as a block on which masking is to be performed.

In an embodiment, the receiver may binarize the transmitted image to convert the transmitted image into a binary image.

In an embodiment, the receiver may divide the frame of the image into blocks each having a predetermined size and may calculate a histogram from a divided block to detect a masked block region.

In an embodiment, the receiver may calculate a standard deviation of the histogram in the divided block, and when the calculated standard deviation is equal to or less than a predetermined threshold value, the receiver may label the divided block as a masked block.

In another general aspect, a method of setting a masking region in a transmitter includes detecting an object region, on which masking is to be performed, from an input image through a camera, converting the detected object region into a block region, performing masking on a converted block region, and encoding and transmitting an input image on which the masking is completed.

In an embodiment, the detecting of the object region may include detecting the object region, expressed as coordinate information, from the image.

In an embodiment, the coordinate information may include a start x coordinate of the object region, a start y coordinate of the object region, a width of the object region, and a height of the object region.

In an embodiment, the converting of the detected object region into the block region may include dividing the frame of the input image into blocks each having a predetermined size, converting the object region expressed as the coordinate information into the block region, checking whether the detected object region is included in the block region, and when it is checked that the detected object region is included in the block region, labeling the object region as a block on which masking is to be performed.

In another general aspect, a method of detecting a masking region in a receiver includes decoding an image transmitted from a transmitted to extract a frame therefrom, detecting a masked block region by units of extracted frames, and unmasking the detected block region to restore the masked image to an original image.

In an embodiment, the decoding of the image may include binarizing the transmitted image to convert the transmitted image into a binary image.

In an embodiment, the detecting of the masked block region may include dividing the frame of the image into blocks each having a predetermined size and calculating a histogram from a divided block to detect a masked block region.

In an embodiment, the calculating of the histogram may include calculating a standard deviation of the histogram in the divided block and, when the calculated standard deviation is equal to or less than a predetermined threshold value, labeling the divided block as a masked block.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

In this disclosure below, when it is described that one comprises (or includes or has) some elements, it should be understood that it may comprise (or include or has) only those elements, or it may comprise (or include or have) other elements as well as those elements if there is no specific limitation.

The present invention relates to a system 100 and method of processing a masking region.

Indiscreet photographing and image leakage, which use smartphones, vehicle black boxes, or drones personalized along with closed-circuit television (CCTV) provided for social safety, cause invasion of privacy and an side effect of an image.

In order to solve such a problem, privacy masking technology has been developed, and an ex-post masking service is applied for actual crime investigation.

In an embodiment of the present invention, in providing privacy masking technology, privacy region information may be included in a moving image, or in extracting masking region information included in a moving image so as to restore an original image of a masked image, block-based technology may be applied, thereby enabling a transmitter 110 and a receiver 120 to share the masking region information without additional information.

Hereinafter, the masking region processing system 100 according to an embodiment of the present invention will be described with reference to FIGS. 2 and 3.

Figure 2:
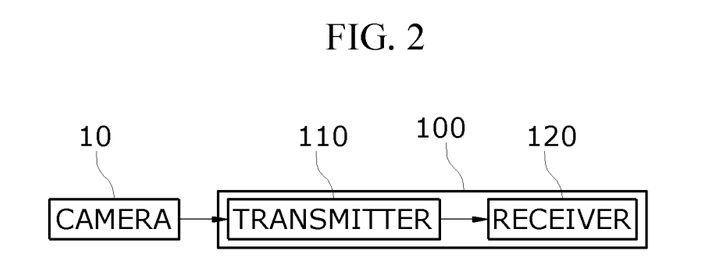
FIG. 2 is a block diagram of a masking region processing system according to an embodiment of the present invention.

FIG. 2 is a block diagram of the masking region processing system 100 according to an embodiment of the present invention. FIG. 3 is a block diagram of each of the transmitter 110 and the receiver 120.

The masking region processing system 100 according to an embodiment of the present invention may include the transmitter 110 and the receiver 120.

The transmitter 110 may detect an object region, on which masking is to be performed, from an input image through a camera 10 and may convert the detected object region into a block region to perform masking. Also, the transmitter 110 may encode an input image on which the masking is completed and may transmit an encoded image to the receiver 120.

The receiver 120 may decode the image transmitted from the transmitter 110 to extract a frame, detect a masked block region by units of extracted frames, and unmask the detected block region to restore the masked image to an original image.

Figure 3:
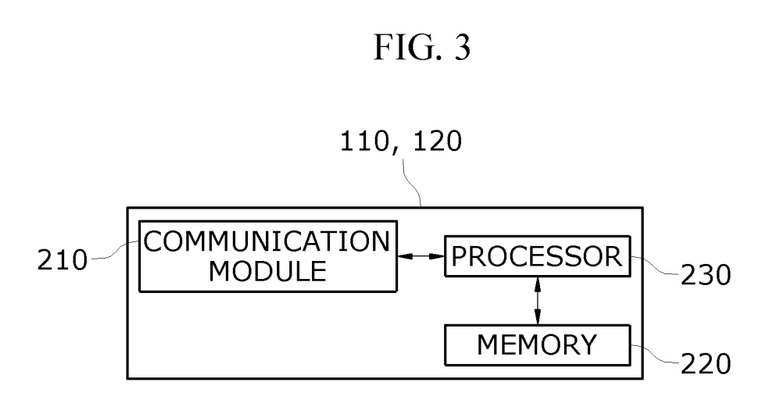
FIG. 3 is a block diagram of each of a transmitter and a receiver.

Referring to FIG. 3, in an embodiment of the present invention, the transmitter 110 and the receiver 120 may each include a communication module 210, a memory 220, and a processor 230.

The communication module 210 may transmit and receive data between the camera 10, the transmitter 110, and the receiver 120. The communication module 210 may include a wired communication module and a wireless communication module. The wired communication module may be implemented as a power cable communication device, a phone wire communication device, cable home (MoCA), Ethernet, IEEE1294, an integrated cable home network, or an RS-485 control device. Also, the wireless communication module may be implemented as wireless local area network (WLAN), Bluetooth, high data rate (HDR) wireless personal area network (WPAN) (HDR WPAN), ultra-wideband (UWB), ZigBee, impulse radio, 60 GHz WPAN, binary-code division multiple access (binary-CDMA), wireless universal serial bus (USB) technology, or wireless high definition media interface (HDMI).

The memory 220 may store a program for setting and transmitting a masking region and a program for detecting a masking region, and the processor 230 may execute the programs stored in the memory 220.

For example, the memory 220 may include NAND flash memory such as a compact flash (CF) card, a secure digital (SD) card, a memory stick, a solid state drive (SSD), and a micro-SD card, a magnetic computer memory device such as a hard disk driver (HDD), and optical disk drive such as CD-ROM and DVD-ROM.

In the masking region processing system 100 according to an embodiment of the present invention, each of the transmitter 110 and the receiver 120 may be configured as an independent server computer and may be operated. In this case, each of the transmitter 110 and the receiver 120 may include the communication module 210, the memory 220, and the processor 230 described above.

On the other hand, the masking region processing system 100 may be implemented as a type where a program for setting and transmitting a masking region in the transmitter 110 and a program for detecting a masking region in the receiver 120 are installed in one server computer and are operated mutually.

For reference, the elements according to an embodiment of the present invention illustrated in FIGS. 2 and 3 may be implemented as software or a hardware type such as field programmable gate array (FPGA) or application specific integrated circuit (ASIC) and may perform certain functions.

However, "elements" are not meanings limited to software or hardware, and each element may be configured to reside in an addressable storage medium and configured to execute on one or more processors.

Thus, an element may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

Hereinafter, a masking region setting method performed in the transmitter 110 and a masking region detecting method performed in the receiver 120, according to an embodiment of the present invention, will be described with reference to FIGS. 4 to 10.

Figure 4:
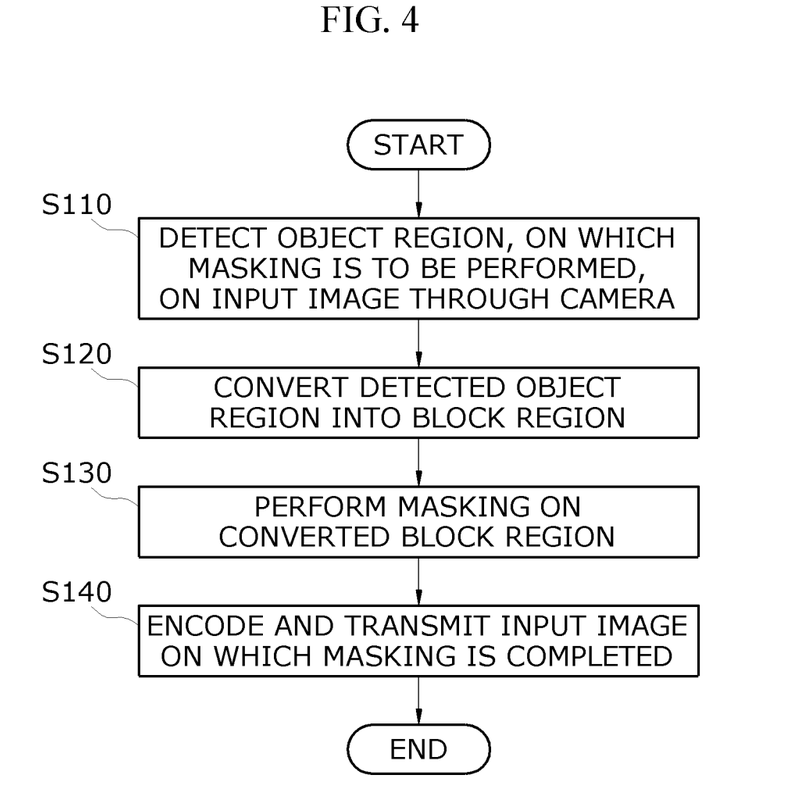
FIG. 4 is a flowchart of a masking region setting method in the transmitter.
Figure 5:
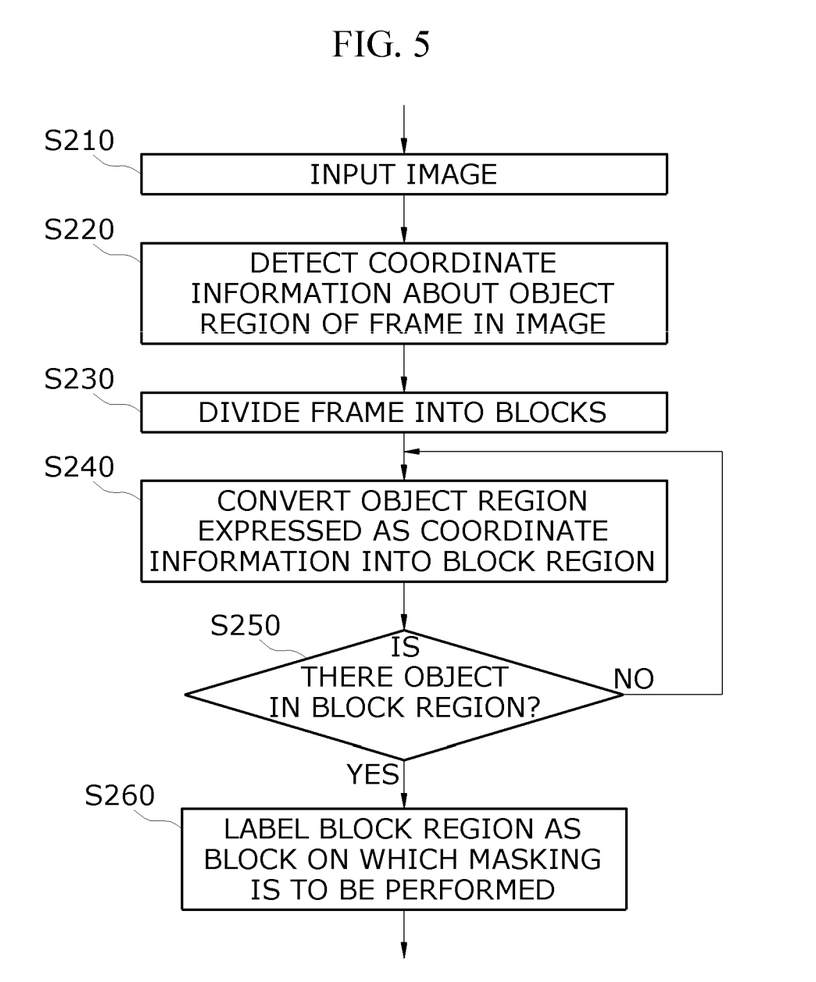
FIG. 5 is a flowchart for describing a process of converting an object region into a block region to perform masking.

FIG. 4 is a flowchart of a masking region setting method in the transmitter 110. FIG. 5 is a flowchart for describing a process of converting an object region into a block region to perform masking.

The masking region setting method according to an embodiment of the present invention may first detect an object region from an input image through the camera 10 on the basis of object detection technology in step S110.

For example, a step of detecting an object region on which masking is to be performed may be a process of detecting an object region, expressed as coordinate information, from the input image through the camera 10.

In this case, the object region detected from the input image may be expressed as coordinate information such as (x, y, width, height). Here, x may denote a start x coordinate of the object region, y may denote a start y coordinate of the object region, width may denote a width of the object region, and height may denote height information about the object region.

Subsequently, the transmitter 110 may convert the object region, expressed as the coordinate information, into a block region in step S120 and may perform masking on a converted block region in step S130.

To describe in detail steps S110 to S130 with reference to FIG. 5, when an image is first input in step S210, and the transmitter 110 may detect coordinate information about an object region in association with a frame of the input image in step S220.

Subsequently, the transmitter 110 may divide the frame of the input image into blocks each having a predetermined size in step S230. For example, the predetermined size may be 64×64 pixels or 32×32 pixels.

Subsequently, the transmitter 110 may convert the object region expressed as the coordinate information into a block region on the basis of the following Equation (1) in step S40.

$$B_{i,j} = \begin{cases} 1, & \text{if } B_{i,j}(x, y) \in O_k(x, y) \\ 0, & \text{otherwise} \end{cases} \quad \text{[Equation 1]}$$

In Equation (1), $B_{i,j}$ may denote a block, disposed $i^{th}$ on the x axis and $j^{th}$ on the y axis, of the input image, and $B_{i,j}(x,y)$ may denote (x,y) coordinates included in $B_{i,j}$.

Also, $O_k$ may denote an object which is detected $k^{th}$ in the input image, and $O_k(x,y)$ may denote (x,y) coordinates included in $O_k$.

Subsequently, the transmitter 110 may check whether the detected object region is included in the block region in step S250, and when the detected object region is included in the block region, the transmitter 110 may label the object region as a block on which masking is to be performed in step S260.

That is, when $O_k(x,y)$ is included in $B_{i,j}(x,y)$, $B_{i,j}$ may be 1 and may be labeled as a masking block, and otherwise, Bi,j may be 0 and may not correspond to a masking block.

Figure 6:
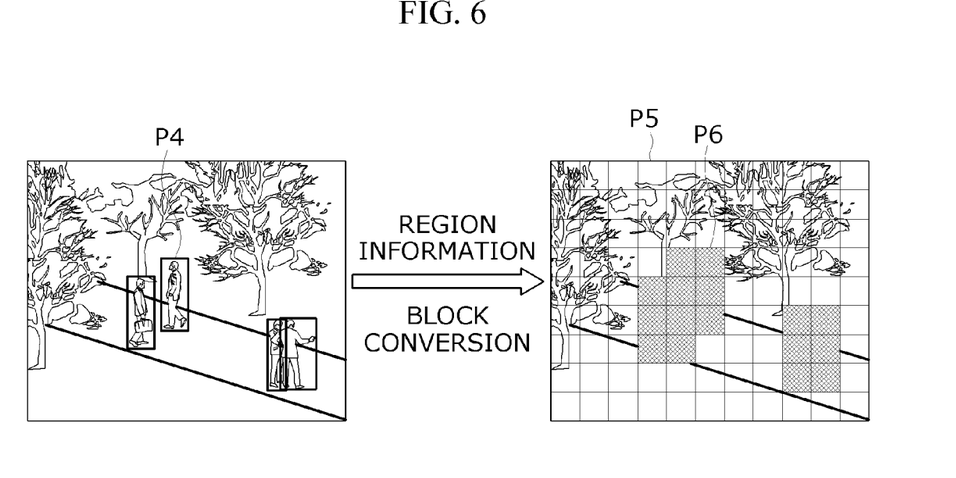
FIG. 6 is a diagram illustrating an embodiment where an object region expressed as coordinate information is converted into block information.

An embodiment of a process illustrated in FIG. 5 is as illustrated in FIG. 6.

FIG. 6 is a diagram illustrating an embodiment where an object region expressed as coordinate information is converted into block information.

As in FIG. 6, an object region P4 expressed as coordinate information may be detected, a frame of an image may be divided into blocks P5 each having a predetermined size, and a block corresponding to the detected object region P4 may be converted into a block region P6.

Figure 7A:
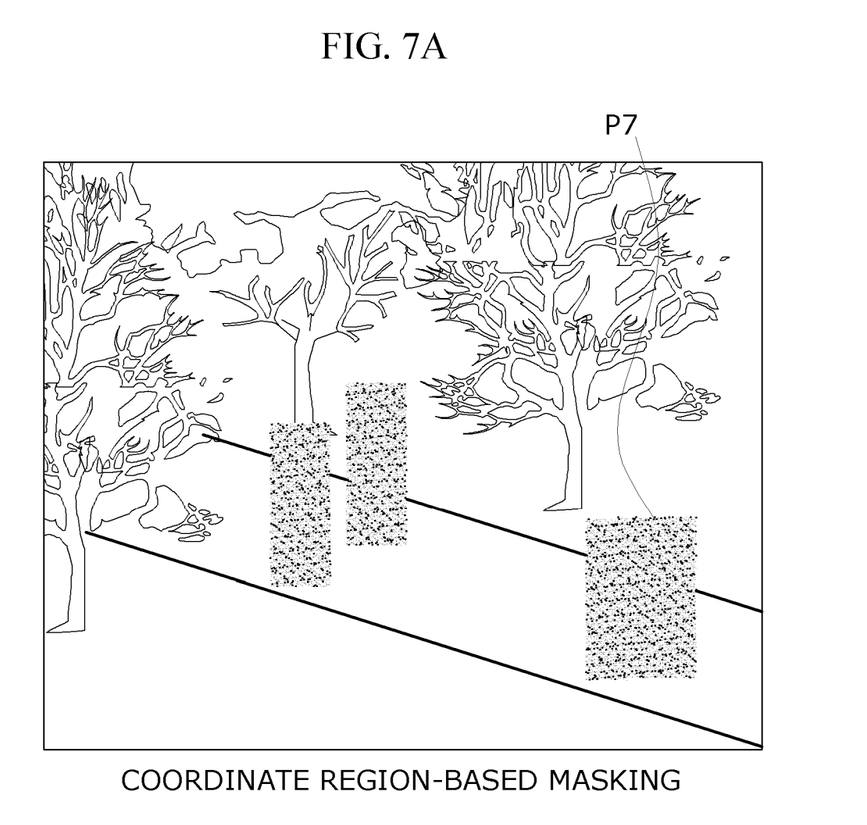
FIG. 7A is a diagram illustrating a case where an object region expressed as coordinate information is masked.
Figure 7B:
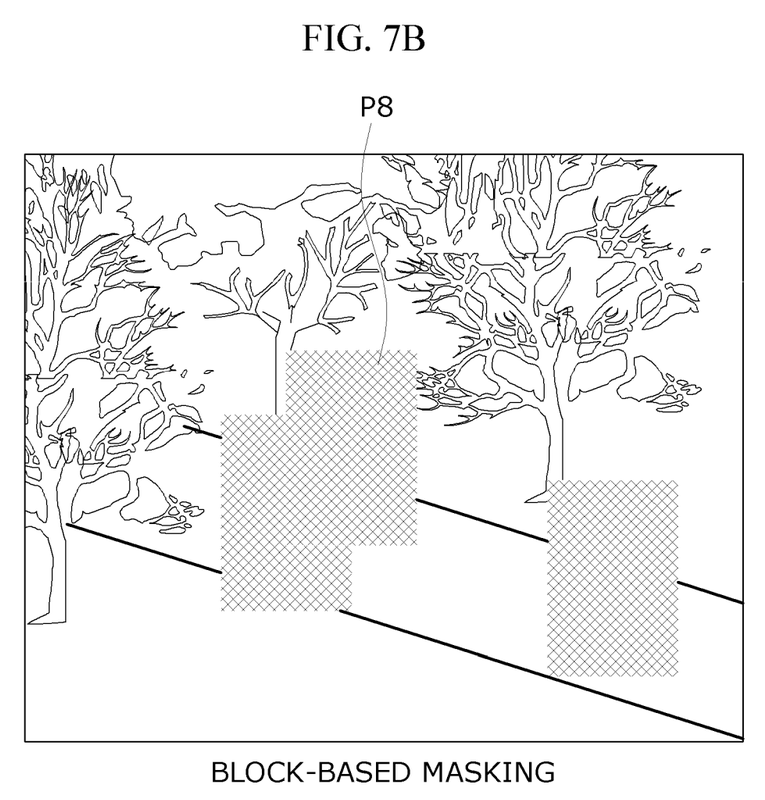
FIG. 7B is a diagram illustrating a case where an object region expressed as block information is masked.

FIG. 7A is a diagram illustrating a case where an object region expressed as coordinate information is masked, FIG. 7B is a diagram illustrating a case where an object region expressed as block information is masked.

In coordinate information-based masking Pin FIG. 7A, since the masking P7 is performed based on detailed coordinate information, masking may be performed on only a region corresponding to an object rather than block-based masking P8, but there is a drawback in that metadata information is needed as described above.

On the other hand, the block-based masking P8 illustrated in FIG. 7B may have performance which is almost similar to the coordinate information-based masking P7, and moreover, even when encoding of an image is applied, the block-based masking P8 may have an advantage where the transmitter 110 and the receiver 120 share masking region information.

Referring again to FIG. 3, when masking performed on a portion set as an object region is completed in this manner, an input image on which masking is completed may be encoded and transmitted to the receiver 120 in step S140.

Figure 8:
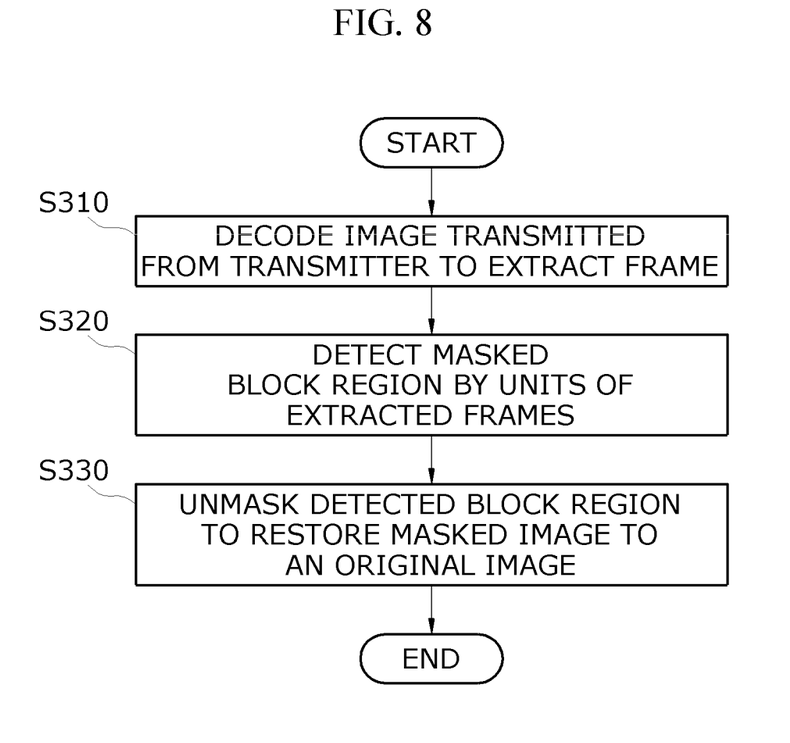
FIG. 8 is a flowchart of a masking region setting method in the receiver.
Figure 9:
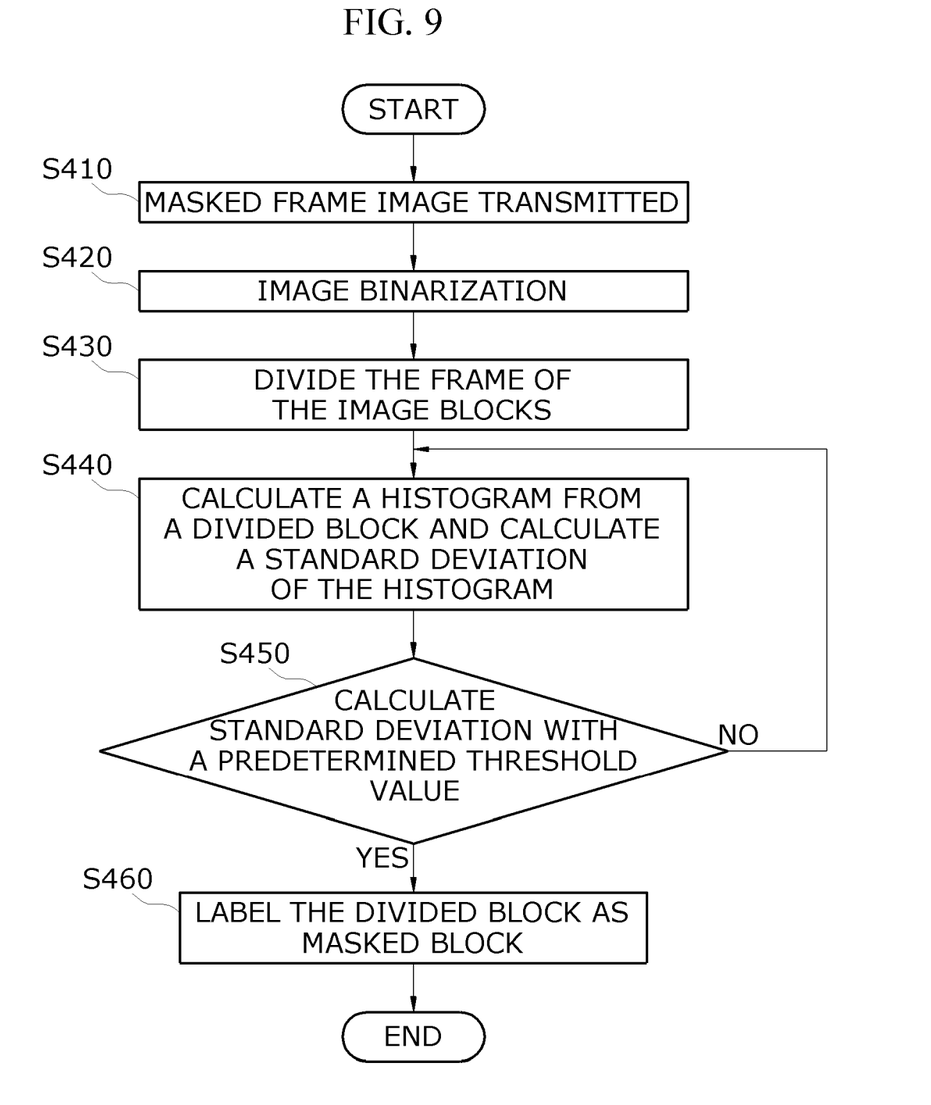
FIG. 9 is a flowchart for describing a process of detecting masking block.

FIG. 8 is a flowchart of a masking region setting method in the receiver 120. FIG. 9 is a flowchart for describing a process of detecting masking block.

As the transmitter 110 encodes and transmits an input image on which masking is completed, the receiver 120 may decode an image transmitted from the transmitter 110 to extract a frame from the image in step S310.

Subsequently, the receiver 110 may detect a block region on which masking has been performed by units of extracted frames in step S320 and may unmask the detected block region to restore a masked image to an original image in step S330.

Specifically, as FIG. 9, first, the receiver 120 receives the masked frame image transmitted from the transmitter 110 in step S410, the receiver 120 may perform image binarization to convert a transmitted color image into a binary image in step S420. And the receiver 120 may divide the frame of the image into blocks each having a predetermined size in step S430. For example, the predetermined size may be 64×64 pixels or 32×32 pixels.

Moreover, the receiver 120 may calculate a histogram from a divided block and may check whether the divided block is a masked block, based on the following Equation (2). That is, the receiver 120 may calculate a standard deviation of the histogram in step S440, and compares the calculated standard deviation with a predetermined threshold value in step S450.

As the results, when the calculated standard deviation is equal to or less than a predetermined threshold value, the receiver 120 may label the divided block as a masked block in step S460.

$$B_{i,j} = \begin{cases} 1, & \text{if } \sigma(h_{i,j}(B_{i,j})) < \text{threshold} \\ 0, & \text{otherwise} \end{cases} \quad \text{[Equation 2]}$$

In Equation (2), $B_{i,j}$ may denote a block, disposed $i^{th}$ on the x axis and $j^{th}$ on the y axis, of the input image, and $h_{i,j}(B_{i,j})$ may denote a histogram of $B_{i,j}$. Also, $\sigma(h_{i,j}(B_{i,j}))$ may denote a standard deviation of $h_{i,j}(B_{i,j})$.

When a value of the calculated standard deviation is equal to or less than the predetermined threshold value, $B_{i,j}$ may be 1 and may be labeled as a masking block, and otherwise, $B_{i,j}$ may be 0 and may not correspond to a masking block. In this case, the predetermined threshold value may be statistically calculated based on a feature of the input image.

Figure 10:
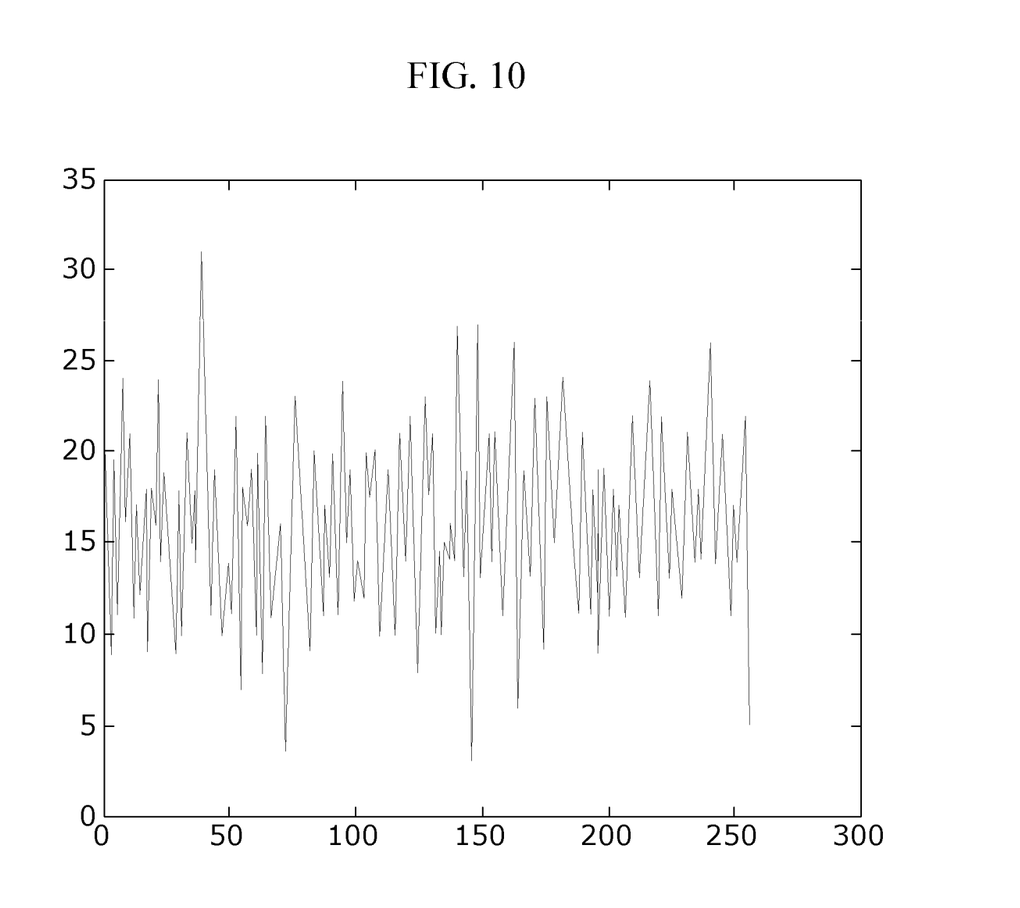
FIG. 10 is diagrams for describing histogram features of when a masked block is binarized.

FIG. 10 is diagrams for describing histogram features of when a masked block is binarized.

Figure 11:
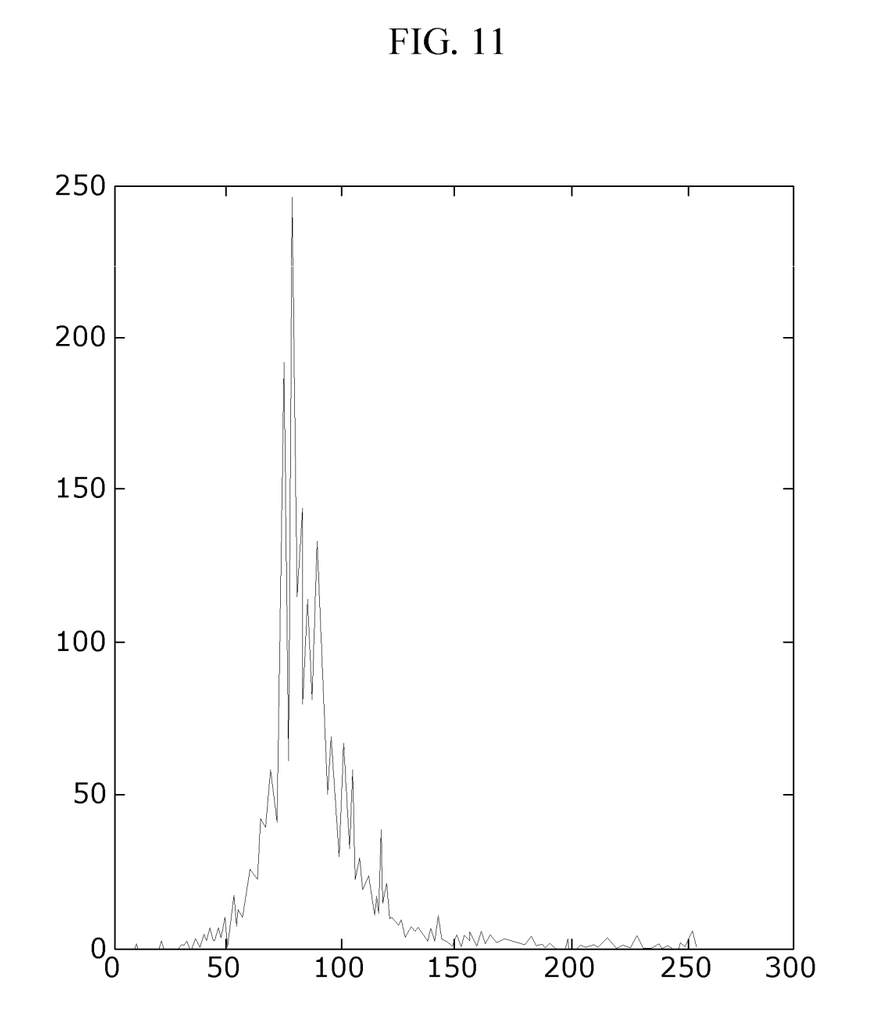
FIG. 11 is diagrams for describing histogram features of when a non-masked block is binarized.

FIG. 11 is diagrams for describing histogram features of when a non-masked block is binarized.

First, when a masked block is binarized and a binarized block. When a histogram of the binarized block after masking is calculated, the histogram may have the characteristic of histogram equalization as in FIG. 10.

Comparing with a histogram which is a binarization result of a non-masked block in FIG. 11, the characteristic of Gaussian distribution may be reduced in standard deviation value.

In an embodiment of the present invention, a masking region may be detected based on a standard deviation feature of a histogram.

As described above, according to the embodiments of the present invention, in a case which provides an image privacy masking service for restoring an original image, privacy region information may be additionally generated, managed, or stored, and thus, the transmitter and the receiver may not perform an undesired synchronization process, thereby providing an efficient service in terms of economy and technology.

In description given above, steps S110 to S460 may be further divided into additional steps or may be combined as fewer steps, based on an implementation embodiment of the present invention. Also, some steps may be omitted depending on the case, and a sequence of steps may be changed. Furthermore, despite other omitted description, description given above with reference to FIGS. 2 and 3 may be applied to the masking region setting and detecting method described above with reference to FIGS. 4 to 11.

The method according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiments of the present invention have been described in association with a specific embodiment, but their elements, some operations, or all operations may be implemented by using a computer system having general-use hardware architecture.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for processing a masking region, the system comprising:
   a transmitter configured to detect an object region, on which masking is to be performed, from an input image through a camera, convert the detected object region into a block region to perform masking, and encode and transmit the input image on which the masking is completed; and
   a receiver configured to decode an image transmitted from the transmitter to extract a frame therefrom, detect a masked block region by units of extracted frames, and unmask the detected block region to restore the masked image to an original image;

wherein the receiver divides the frame of the image into blocks each having a predetermined size and calculates a histogram from a divided block to detect a masked block region; and wherein the receiver calculates a standard deviation of the histogram in the divided block, and when the calculated standard deviation is equal to or less than a predetermined threshold value, the receiver labels the divided block as a masked block.

2. The system of claim 1, wherein the transmitter detects the object region, expressed as coordinate information, from the input image through the camera.

3. The system of claim 2, wherein the coordinate information comprises a start x coordinate of the object region, a start y coordinate of the object region, a width of the object region, and a height of the object region.

4. The system of claim 2, wherein the transmitter divides the frame of the input image into blocks each having a predetermined size and converts the object region expressed as the coordinate information into the block region.

5. The system of claim 4, wherein the transmitter checks whether the detected object region is included in the block region, and when it is checked that the detected object region is included in the block region, the transmitter labels the object region as a block on which masking is to be performed.

6. The system of claim 1, wherein the receiver binarizes the transmitted image to convert the transmitted image into a binary image.

7. A method of setting a masking region in a transmitter, the method comprising:
    detecting an object region, on which masking is to be performed, from an input image through a camera;
    converting the detected object region into a block region;
    performing masking on a converted block region; and
    encoding and transmitting the input image on which the masking is completed;
    wherein the converting of the detected object region into the block region comprises:
    dividing a frame of the input image into blocks each having a predetermined size;
    converting the object region expressed as coordinate information into the block region;
    checking whether the detected object region is included in the block region; and
    when it is checked that the detected object region is included in the block region, labeling the object region as a block on which masking is to be performed; and wherein the checking whether the detected object region is included in the block region includes applying equation $B_{i,j}$, where wherein the checking whether the detected object region is included in the block region includes applying equation $B_{i,j}$, where $$B_{i,j} = \begin{cases} 1, & \text{if } B_{i,j}(x, y) \in O_k(x, y) \\ 0, & \text{otherwise} \end{cases},$$

$B_{i,j}$ denoting a block, disposed $i^{th}$ on an x axis and $j^{th}$ on a y axis, of the input image, and $B_{i,j}$ denoting (x, y) coordinates included in $B_{i,j}$, $O_k$ denoting an object which is detected $k^{th}$ in the input image, and $O_k(x, y)$ denoting (x, y) coordinates included in $O_k$, and $B_{i,j}=1$ indicates that $B_{i,j}$ is a masking block, and $B_{i,j}=0$ indicates that $B_{i,j}$ is not a masking block.

8. The method of claim 7, wherein the detecting of the object region comprises detecting the object region, expressed as the coordinate information, from the image.

9. The method of claim 8, wherein the coordinate information comprises a start x coordinate of the object region, a start y coordinate of the object region, a width of the object region, and a height of the object region.

10. A method of detecting a masking region in a receiver, the method comprising:
    decoding an image transmitted from a transmitter to extract a frame therefrom;
    detecting a masked block region by units of extracted frames; and
    unmasking the detected block region to restore the masked image to an original image;
    wherein the detecting of the masked block region comprises dividing the frame of the image into blocks each having a predetermined size; and
    calculating a histogram from a divided block to detect the masked block region; and
    wherein the calculating of the histogram comprises:
    calculating a standard deviation of the histogram in the divided block; and
    when the calculated standard deviation is equal to or less than a predetermined threshold value, labeling the divided block as a masked block.

11. The method of claim 10, wherein the decoding of the image comprises binarizing the transmitted image to convert the transmitted image into a binary image.

* * * * *